United States Patent [19]
Anelli

[11] Patent Number: 5,865,098
[45] Date of Patent: Feb. 2, 1999

[54] MULTIPLE CONTAINER SLOW COOKER DEVICE

[76] Inventor: Deborah J. Anelli, 1900 W. La Rua, Pensacola, Fla. 32501

[21] Appl. No.: 130,123

[22] Filed: Aug. 6, 1998

[51] Int. Cl.[6] .............................. A47J 27/00; A47J 27/10
[52] U.S. Cl. .............................. 99/331; 99/337; 99/341; 99/403; 99/448; 126/246; 126/374; 126/375; 219/432; 219/438; 219/442
[58] Field of Search ............................ 99/326, 331–333, 99/330, 339, 340, 341, 403–410, 422, 448, 447, 483, 411–417; 126/373–375, 246, 390, 369, 20; 220/592, 23, 23.8, 489, 246, 315, 912; 219/436, 438, 439, 442, 424, 430, 432, 530, 535, 521, 536, 386, 391; 426/510, 523; D7/354, 355, 357, 358, 360, 367

[56] References Cited

U.S. PATENT DOCUMENTS

| | | | |
|---|---|---|---|
| D. 376,067 | 12/1996 | Littmann | D7/360 |
| 2,785,277 | 3/1957 | Jepson | 219/44 |
| 3,801,331 | 4/1974 | Sano et al. | 99/403 |
| 3,806,701 | 4/1974 | Scott | 219/438 |
| 3,908,111 | 9/1975 | Du Bois et al. | 219/442 |
| 4,005,645 | 2/1977 | Janssen | 99/403 |
| 4,039,777 | 8/1977 | Baker | 219/442 X |
| 4,176,593 | 12/1979 | Terzian | 99/422 |
| 4,258,695 | 3/1981 | McCarton et al. | 126/375 |
| 4,298,789 | 11/1981 | Eichelberger et al. | 219/521 X |
| 4,307,287 | 12/1981 | Weiss | 219/432 X |
| 4,932,527 | 6/1990 | Hayes | 99/331 |
| 5,241,900 | 9/1993 | Piane, Sr. | 99/422 |
| 5,348,187 | 9/1994 | Schultz | 126/373 X |
| 5,355,777 | 10/1994 | Chen et al. | 99/410 X |
| 5,400,700 | 3/1995 | Bois | 99/403 |
| 5,520,103 | 5/1996 | Zielinski et al. | 126/246 X |
| 5,673,611 | 10/1997 | Tieman | 99/415 X |

Primary Examiner—Timothy F. Simone
Attorney, Agent, or Firm—Joseph N. Breaux

[57] ABSTRACT

A multiple container slow cooker device that includes a manual disabling mechanism for manually disabling the cooking element of one of the food cooking containers and an automatic cooking element disabling mechanism for disconnecting the cooking element of any cooking container not at least partially filled. The multiple container slow cooker device includes a cooker housing having at least two cooking container insertion cavities formed therein each defined by a housing cavity portion, at least two cooking element circuits installed within the cooker housing; and at least two cooking container assemblies each including a lower container member sized to fit into one of the at least two cooking container insertion cavities and a transparent lid member sized to cover an opening of the lower container member.

1 Claim, 2 Drawing Sheets

MULTIPLE CONTAINER SLOW COOKER DEVICE

TECHNICAL FIELD

The present invention relates to cooking systems and more particularly to a multiple container slow cooker device; the multiple container slow cooker device including a cooker housing having at least two cooking container insertion cavities formed therein each defined by a housing cavity portion, at least two cooking element circuits installed within the cooker housing; and at least two cooking container assemblies each including a lower container member sized to fit into one of the at least two cooking container insertion cavities and a transparent lid member sized to cover an opening of the lower container member; each of the at least two cooking container insertion cavities having a keyway formed in connection with an upper edge thereof having a high temperature, momentary contact, cooking element enable switch positioned therein and a cooking container support spring extending into the bottom center thereof; each lower container member including a key extending from an upper edge thereof sized to fit into one of the keyways formed into each cooking container insertion cavity; the key being insertable into each keyway a distance sufficient to depress and close the cooking element enable switch positioned therein; the cooking container support spring having a spring constant sufficient to hold an empty cooking container assembly positioned into a cooking container insertion cavity at a height sufficient to prevent the key of the lower container member from depressing and closing the momentary contact cooking element enable switch positioned within the keyway; the at least two cooking element circuits each including one of the momentary contact, cooking element enable switches, a resistance cooking element, and a two-position on/off switch that are wired together in series; each of the at least two cooking element circuits being wired in parallel with each other and in series with a pair of electrical power cord connecting terminals and a variable resistance temperature control switch; each of the resistance cooking elements being positioned beneath one of the at least two cooking container insertion cavities.

BACKGROUND ART

It is often necessary when cooking for more than one person to prepare a dish differently for one or more person because of medical conditions or personal eating habits. It would be a benefit, therefore, to have a multiple container slow cooker device that could be used by a food preparer that included separate food cooking containers positionable within a single cooker housing that could be used to prepare two versions of the same dish. Because it could also be desirable to use the slow cooker for cooking only one dish, it would be a further benefit to have a multiple container slow cooker device that included a manual disabling mechanism for manually disabling the cooking element of one of the food cooking containers to prevent damage to the multiple container slow cooker device caused by overheating an empty food cooking container. Because a user may forget to manually disable one of the cooking elements, it would be a further benefit to have an automatic cooking element disabling mechanism for disconnecting the cooking element of any cooking container not at least partially filled. It would of course be a further benefit to have a multiple container slow cooker that included both manual and automatic cooking element disabling mechanisms.

GENERAL SUMMARY DISCUSSION OF INVENTION

It is thus an object of the invention to provide a multiple container slow cooker device.

It is a further object of the invention to provide a multiple container slow cooker device that includes a manual disabling mechanism for manually disabling the cooking element of one of the food cooking containers.

It is a still further object of the invention to provide a multiple container slow cooker device that includes an automatic cooking element disabling mechanism for disconnecting the cooking element of any cooking container not at least partially filled.

It is a still further object of the invention to provide a multiple container slow cooker device that includes a cooker housing having at least two cooking container insertion cavities formed therein each defined by a housing cavity portion, at least two cooking element circuits installed within the cooker housing; and at least two cooking container assemblies each including a lower container member sized to fit into one of the at least two cooking container insertion cavities and a transparent lid member sized to cover an opening of the lower container member; each of the at least two cooking container insertion cavities having a keyway formed in connection with an upper edge thereof having a high temperature, momentary contact, cooking element enable switch positioned therein and a cooking container support spring extending into the bottom center thereof; each lower container member including a key extending from an upper edge thereof sized to fit into one of the keyways formed into each cooking container insertion cavity; the key being insertable into each keyway a distance sufficient to depress and close the cooking element enable switch positioned therein; the cooking container support spring having a spring constant sufficient to hold an empty cooking container assembly positioned into a cooking container insertion cavity at a height sufficient to prevent the key of the lower container member from depressing and closing the momentary contact cooking element enable switch positioned within the keyway; the at least two cooking element circuits each including one of the momentary contact, cooking element enable switches, a resistance cooking element, and a two-position on/off switch that are wired together in series; each of the at least two cooking element circuits being wired in parallel with each other and in series with a pair of electrical power cord connecting terminals and a variable resistance temperature control switch; each of the resistance cooking elements being positioned beneath one of the at least two cooking container insertion cavities.

It is a still further object of the invention to provide a multiple container slow cooker device that accomplishes some ro all of the above objects in combination.

Accordingly, a multiple container slow cooker device is provided. The multiple container slow cooker device is including a cooker housing having at least two cooking container insertion cavities formed therein each defined by a housing cavity portion, at least two cooking element circuits installed within the cooker housing; and at least two cooking container assemblies each including a lower container member sized to fit into one of the at least two cooking container insertion cavities and a transparent lid member sized to cover an opening of the lower container member; each of the at least two cooking container insertion cavities having a keyway formed in connection with an upper edge thereof having a high temperature, momentary contact, cooking element enable switch positioned therein and a cooking container support spring extending into the bottom center thereof; each lower container member including a key extending from an upper edge thereof sized to fit into one of the keyways formed into each cooking container insertion cavity; the key being insertable into each keyway a distance sufficient to depress and close the cooking element enable switch positioned therein; the cooking container support spring having a spring constant sufficient to hold an empty cooking container assembly positioned into a cooking container insertion cavity at a height sufficient to prevent the key of the lower container member from depressing and closing the momentary contact cooking element enable switch positioned within the keyway; the at least two cooking element circuits each including one of the momentary contact, cooking element enable switches, a resistance cooking element, and a two-position on/off switch that are wired together in series; each of the at least two cooking element circuits being wired in parallel with each other and in series with a pair of electrical power cord connecting terminals and a variable resistance temperature control switch; each of the resistance cooking elements being positioned beneath one of the at least two cooking container insertion cavities.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
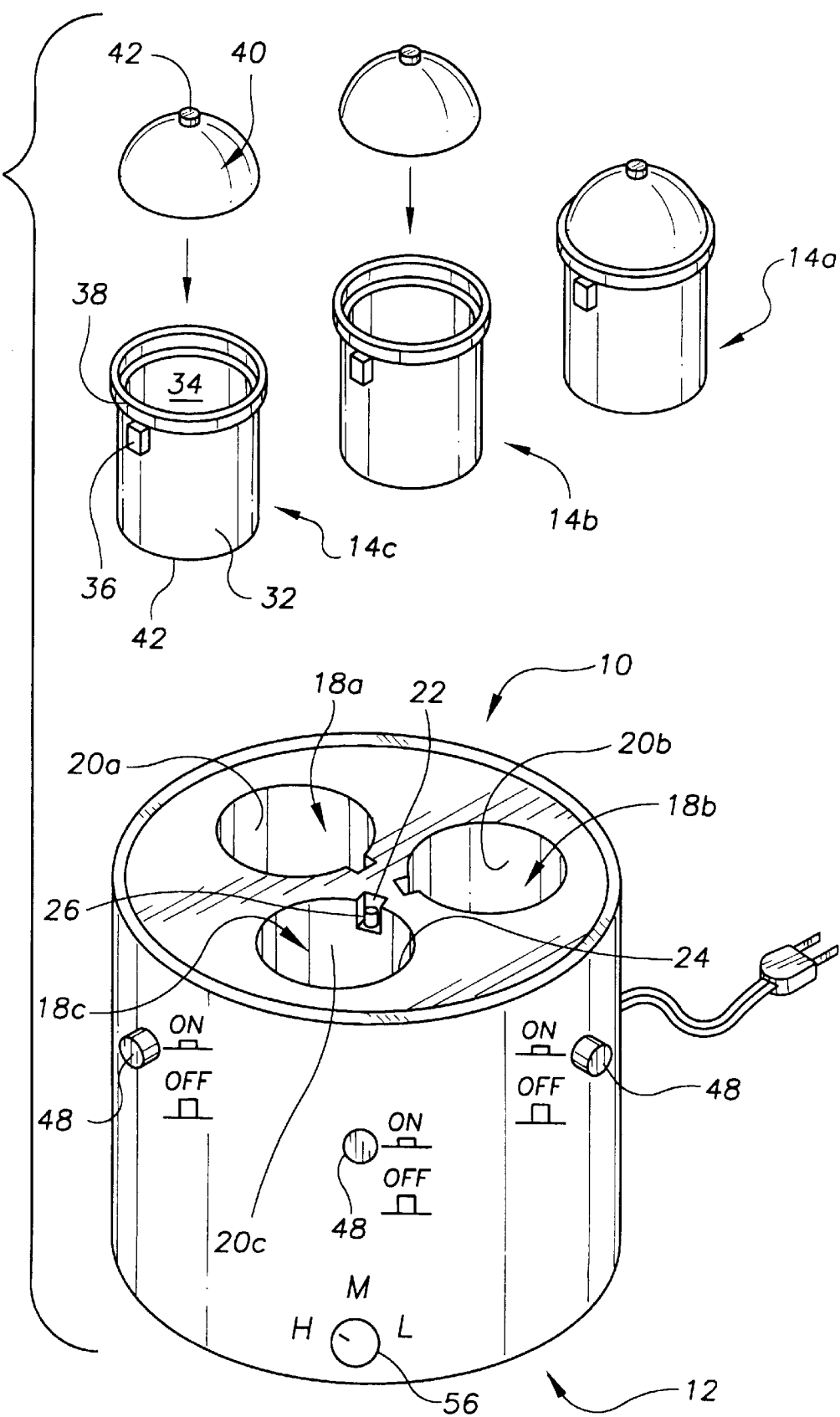
FIG. 1 is a perspective view of an exemplary embodiment of the multiple container slow cooker device of the present invention showing the cooker housing including three container cooking element on/off switches, three cooking container insertion cavities formed into the cooker housing each having a keyway with a high temperature, momentary contact cooking element enable switch positioned therein, a master temperature control knob, and a power cord; and three identical cooking container assemblies each including a lower container member and a transparent lid member, the lower container member including a key extending from an upper edge thereof sized to fit into one of the keyways formed into each cooking container insertion cavity, the key being insertable into each keyway a distance sufficient to depress and close the cooking element enable switch positioned therein.

FIG. 1 shows an exemplary embodiment of the multiple container slow cooker device of the present invention generally designated by the numeral 10. In this embodiment, slow cooker device 10 includes a cooker housing, generally designated 12; three identical cooking container assemblies, generally designated 14a–c; and three identical cooking element circuits, generally designated 16a–c (FIG. 4).

Figure 2:
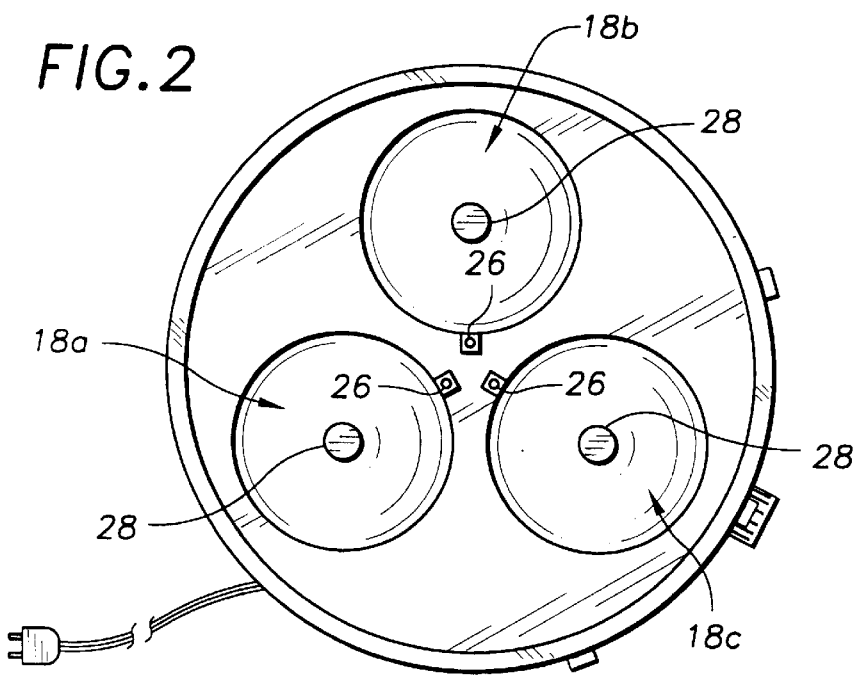
FIG. 2 is a top plan view of the cooker housing of the exemplary the multiple container slow cooker device of FIG. 1 showing the top surface of the cooker housing, the three circular cooking container insertion cavities each having a keyway with a high temperature, momentary contact, cooking element enable switch positioned therein and a cooking container support spring extending into the bottom center thereof; the master temperature control knob; the three container cooking element on/off switches; and the power cord.

Cooker housing 12 has three cooking container insertion cavities, generally designated 18a–c, formed therein each defined by a housing cavity portion, 20a–c. Each cooking container insertion cavity 18a–c has a rectangular keyway 22 formed in connection with an upper edge 24 thereof that has a high temperature, momentary contact, cooking element enable switch 26 positioned therein and, with reference to FIG. 2, a cooking container support spring 28 extending through a hole 28a in the housing cavity portion 20a–c and into the bottom center thereof.

Referring back to FIG. 1, each cooking container assembly 14a–c includes a lower container member 32 constructed of glass and having a food holding chamber 34 provided therein, a rectangular key 36 extending from an upper edge 38 thereof that is sized to fit into one of the keyways 22 formed into each cooking container insertion cavity 18a–c; and a transparent, dome shaped glass cover 40 having a handle 42. Cover 40 covers the opening of food holding chamber 34. Each key 36 is insertable into each keyway 22 a distance sufficient to depress and close the cooking element enable switch 26 positioned therein when lower container member 32 is fully inserted into a cooking container insertion cavity 18a–c and a bottom surface 42 of lower container member 32 is, referring to FIG. 3, in contact with and fully compressing cooking container support spring 28. The spring constant of cooking container support spring 28 is selected such that cooking container support spring 28 is sufficiently strong to support an empty cooking container assembly 14a–c (FIG. 1) having a lower container member 32 positioned into cooking container insertion cavity 18a–c at a height sufficient to prevent key 36 (FIG. 1) of lower container member 32 (FIG. 2) from depressing and closing momentary contact cooking element enable switch 26. In this embodiment at least three ounces of food and/or water must be placed within food holding chamber 34 (FIG. 1) to compress cooking container support spring 28 before key 36 (FIG. 1) compresses and closes momentary contact cooking element enable switch 26.

Figure 3:
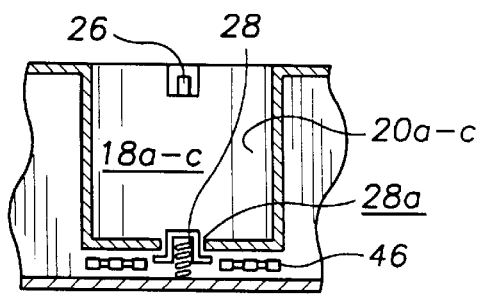
FIG. 3 is a cross sectional view through the cooker housing showing one of the three circular cooking container insertion cavities defined into the cooker housing, the keyway formed in connection with the cooking container insertion cavity, the high temperature, momentary contact, cooking element enable switch positioned within the keyway, the cooking container support spring and cover member extending into the bottom center of the cooking container insertion cavity, and the resistance cooking element positioned beneath the cooking container insertion cavity; the cooking container support spring having a spring constant sufficient to hold an empty cooking container assembly at a height sufficient to prevent the key of the lower container member from depressing and closing the momentary contact cooking element enable switch positioned within the keyway.
Figure 4:
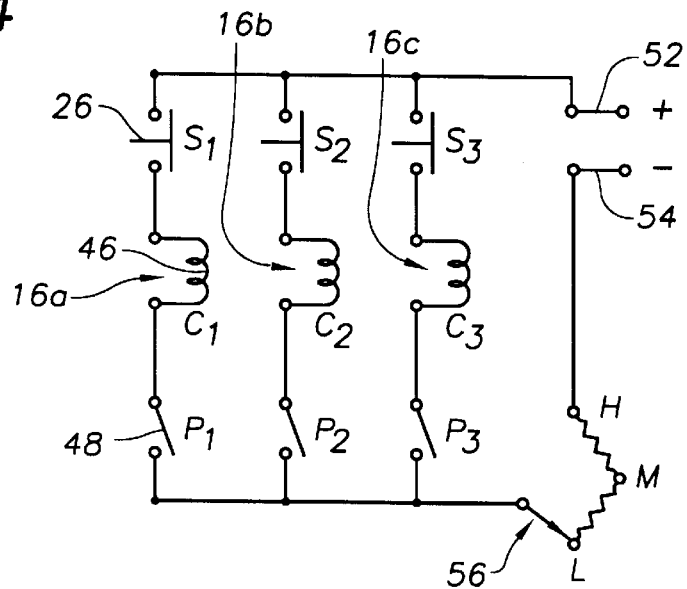
FIG. 4 is a schematic diagram of the exemplary multiple container slow cooker device of FIG. 1 showing the electrical power cord connecting terminals, the three position temperature control switch, and the three cooking element circuits each including a momentary contact, cooking element enable switch, a resistance cooking element, and a two-position on/off switch wired in series; the three cooking element circuits being wired in parallel with each other and in series with the electrical power cord connecting terminals and the three position temperature control switch.

With reference to FIG. 4, each cooking element circuit 16a–c includes one of the momentary contact, cooking element enable switches 26, a conventional resistance cooking element 46, and a two-position on/off switch 48 that are wired together in series. Each cooking element 46 (FIG. 3) is positioned beneath a cooking container insertion cavity 18a–c (FIG. 3). The three cooking element circuits 16a–c are wired in parallel with each other and in series with a pair of electrical power cord connecting terminals 52,54 and a variable resistance temperature control switch, generally designated 56.

It can be seen that both the momentary contact, cooking element enable switches 26 must be closed, as described herein above, and the two-position on/off switch 48 must be closed manually before the cooking element 46 of a cooking element circuit 16a–c applies heat for cooking. The temperature of cooking elements 46 is regulated by the position of variable resistance temperature control switch 56.

It can be seen from the preceding description that a multiple container slow cooker device has been provided that includes a manual disabling mechanism for manually disabling the cooking element of one of the food cooking containers; that includes an automatic cooking element disabling mechanism for disconnecting the cooking element of any cooking container not at least partially filled; and that includes a cooker housing having at least two cooking container insertion cavities formed therein each defined by a housing cavity portion, at least two cooking element circuits installed within the cooker housing; and at least two cooking container assemblies each including a lower container member sized to fit into one of the at least two cooking container insertion cavities and a transparent lid member sized to cover an opening of the lower container member; each of the at least two cooking container insertion cavities having a keyway formed in connection with an upper edge thereof having a high temperature, momentary contact, cooking element enable switch positioned therein and a cooking container support spring extending into the bottom center thereof; each lower container member including a key extending from an upper edge thereof sized to fit into one of the keyways formed into each cooking container insertion cavity; the key being insertable into each keyway a distance sufficient to depress and close the cooking element enable switch positioned therein; the cooking container support spring having a spring constant sufficient to hold an empty cooking container assembly positioned into a cooking container insertion cavity at a height sufficient to prevent the key of the lower container member from depressing and closing the momentary contact cooking element enable switch positioned within the keyway; the at least two cooking element circuits each including one of the momentary contact, cooking element enable switches, a resistance cooking element, and a two-position on/off switch that are wired together in series; each of the at least two cooking element circuits being wired in parallel with each other and in series with a pair of electrical power cord connecting terminals and a variable resistance temperature control switch; each of the resistance cooking elements being positioned beneath one of the at least two cooking container insertion cavities.

It is noted that the embodiment of the multiple container slow cooker device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multiple container slow cooker device comprising:

a cooker housing having at least two cooking container insertion cavities formed therein each defined by a housing cavity portion;

at least two cooking element circuits installed within said cooker housing; and at least two cooking container assemblies each including a lower container member sized to fit into one of said at least two cooking container insertion cavities and a transparent lid member sized to cover an opening of said lower container member;

each of said at least two cooking container insertion cavities having a keyway formed in connection with an upper edge thereof having a high temperature, momentary contact, cooking element enable switch positioned therein and a cooking container support spring extending into said bottom center thereof;

each lower container member including a key extending from an upper edge thereof sized to fit into one of said keyways formed into each cooking container insertion cavity;

said key being insertable into each keyway a distance sufficient to depress and close said cooking element enable switch positioned therein;

said cooking container support spring having a spring constant sufficient to hold an empty cooking container assembly positioned into a cooking container insertion cavity at a height sufficient to prevent said key of said lower container member from depressing and closing said momentary contact cooking element enable switch positioned within said keyway;

said at least two cooking element circuits each including one of said momentary contact, cooking element enable switches, a resistance cooking element, and a two-position on/off switch that are wired together in series;

each of said at least two cooking element circuits being wired in parallel with each other and in series with a pair of electrical power cord connecting terminals and a variable resistance temperature control switch;

each of said resistance cooking elements being positioned beneath one of said at least two cooking container insertion cavities.

* * * * *